United States Patent [19]

Wehr et al.

[11]  4,220,493
[45]  Sep. 2, 1980

[54] APPARATUS FOR JOINING THE STRIP ENDS OF A PLASTIC STRIP

[75] Inventors: Hubert Wehr, Cologne; Karl-Heinz Schlösser, Brühl, both of Fed. Rep. of Germany

[73] Assignee: Cyklop-Gesellschaft Emil Hoffman, Cologne, Fed. Rep. of Germany

[21] Appl. No.: 825,302

[22] Filed: Aug. 17, 1977

[30] Foreign Application Priority Data

Sep. 15, 1976 [DE] Fed. Rep. of Germany ....... 2641373

[51] Int. Cl.² .................... B65H 21/00; G03D 15/04
[52] U.S. Cl. .................................... 156/380; 156/502; 156/513; 156/518; 156/530; 156/581
[58] Field of Search ............... 156/275, 380, 502, 510, 156/157, 272, 273, 513, 499, 530, 159, 522, 517, 518, 581, 506

[56] References Cited

U.S. PATENT DOCUMENTS

| 2,441,821 | 5/1948 | Kendall | 156/513 |
| 2,662,045 | 12/1953 | Baggott | 156/275 |
| 2,684,775 | 7/1954 | Von Hofe | 156/581 |
| 3,239,403 | 3/1966 | Williams et al. | 156/275 |
| 3,647,599 | 3/1972 | Gardner | 156/502 |

Primary Examiner—Michael G. Wityshyn
Attorney, Agent, or Firm—Meyer, Tilberry & Body

[57] ABSTRACT

A method and apparatus for joining the strip ends of a plastic strip using a piece of wire cloth overlaying the end. The front edges of the wire cloth are bonded to the plastic strip to a lesser degree than the median portions of the cloth by either heating the ends less or pressing the ends against the plastic strip to a lesser degree than the median portions.

4 Claims, 8 Drawing Figures

APPARATUS FOR JOINING THE STRIP ENDS OF A PLASTIC STRIP

The invention is concerned with a method and an apparatus for joining the strip ends of a plastic strip, particularly those of a rim-covering strip of polyester, in which between the superposed strip ends a piece of wire cloth is inserted and heated and simultaneously or subsequently the strip ends with the inserted piece of wire cloth are pressed together.

From the German laid-open patent application N. 2 102 344, an apparatus for the execution of such a method has become known by means of which strip closures of high strength can be produced. In a stress examination tests have shown that in the case of failure of the binding under high tension the site of rupture lies always in the area of one of the front edges of the wire-cloth strip. It is assumed that the rupture of the strip occurs there by the action of a notch the piece of wire cloth has left behind in the plastic strip.

It is an object of the invention to prevent the formation of such a weak spot in the strip in the area of the front edges of the piece of wire cloth by simple means and to increase the strength of the bond even to a larger extent.

This problem is solved by the method according to the invention in that the piece of wire cloth is heated to a lesser degree at its front edges at right angles to the longitudinal direction of the strip ends and/or subjected to less pressure than in its remaining area.

This method offers the advantage that the piece of wire cloth in the area of its front edges softens the plastic strip less or it pressed there less deeply into it. Weakening of the ends of the plastic strip in this area is thereby avoided and no notching action occurs which could induce the fracture of the plastic strip.

According to the invention a piece of wire cloth is suitably used whose corners are removed. The piece of wire cloth is appropriately rectangular and at its corners cut off, punched out or rounded. This configuration has the advantage that in case of electrical heating, the current does not flow through the area of the front edges. There exists then no immediate softening of the plastic material. Moreover, there results a smaller current consumption in case of electrical heating of the piece of wire cloth.

Instead of removing the corners, pieces of wire cloth can also be used whose individual wires, extending at right angles to the longitudinal direction of the strip ends, have a conductivity differing from each other, in which setup the conductivity of the wires in the vicinity of the front edges of the wire-cloth piece extending at right angles to the longitudinal direction of the strip ends is suitably less than the conductivity of the wires in the median area. Thereby can also be achieved a variated heating of the wire-mesh area in such a way that the superficial softening of the plastic strip ends to be joined together is less than in the median area.

For carrying out the method, an apparatus for joining the strip ends of a plastic strip can be used with pieces of wire cloth inserted at the junction, which apparatus has a pressing device consisting of a sealing ram and a back-pressure plate for pressing together the strip ends to which is delivered from one side through a channel a strip of wire cloth which with its front end butts against an electrode on the opposite side of the strip ends and is cut off at an electrode on the one side of the strip ends. In such an apparatus, the width of the electrodes, according to the invention, in the longitudinal direction of the strip ends can be smaller than the largest width of the piece of wire cloth inserted between the strip ends. Since hereby the contact surface of the electrodes on the piece of wire cloth is smaller than the total width of the piece of wire cloth, also the current supply to the wire-cloth and the softening of the surfaces of the strip ends to be joined together is concentrated on the median area of the wire-cloth piece and decreases toward the front edges, so that there no deformation can take place.

According to another characteristic of the invention, piercing tools can be arranged in places opposite each other of the wire-cloth channel whose distance from the cutting edge of a punch corresponds to the length of a wire-cloth piece to be inserted between the strip ends and which punch in forming the ends cuts through the open-edged recesses in the wire-cloth strip. This construction has the advantage that also pieces of wire cloth with removed corners can be cut off from a continuous wire-cloth strip and that difficulties do not arise in the feeding of the wire-cloth strip, since the recesses are punched out only immediately prior to the insertion of the wire-cloth piece between the strip ends. The piercing tools are in such a setup suitably actuated by the sealing ram, so that simultaneously with the sealing of a rim-covering strip the recesses for the following wire-cloth are punched out.

Another device for the joining of strip ends according to the invention is characterized in that the sealing ram and/or the back-pressure plate do not come up at least in the median area of their pressure surface to the front edges extending at right angles to the longitudinal direction of the strip. The piece of wire cloth is in this case with the application of a voltage indeed uniformly heated over its entire surface, but a varying contact pressure is exerted upon the width of the wire-cloth piece which decreases toward the front edges of the wire-cloth piece. The heat is hereby carried off in the area of the front edges of the wire-cloth piece in the longitudinal direction of the strip ends to be joined to a larger degree than in the median area. The thoroughness of the fusion decreases therefore somewhat towards the front edges of the wire-cloth piece and the surface of the plastic strip ends is here softened to a lesser degree, so that the detrimental notching effect cannot occur.

The area of pressure of the sealing ram and/or the back-pressure plate can for this purpose be chamfered on the front edges extending at right angles to the longitudinal direction of the strip. It is also possible to give the front edges a convex shape.

According to another characteristic of the invention, the pressure area of the sealing ram and/or the back-pressure plate also on each of the front edges extending at right angles to the longitudinal direction of the strip can have a concave, open-edged recess. The thrust of the sealing ram concentrates then reliably on the median area of the wire-cloth piece. A good fusion is at the same time achieved over the entire length of the longitudinal edges of the wire-cloth strip on the strip edges, since the latter are clamped over their entire length between the pressing tools.

The invention is explained in detail by the drawings on the basis of examples of execution. It is shown in:

Figure 1:
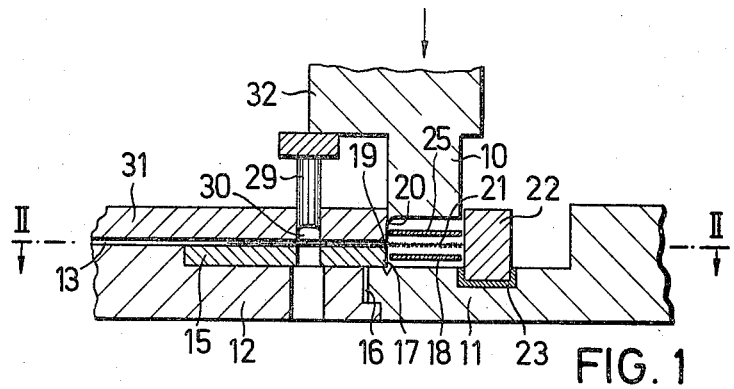
FIG. 1 is a schematic partial section through the pressing station of a sealing device for plastic rim-covering strips of a preferred embodiment of the invention.
Figure 2:
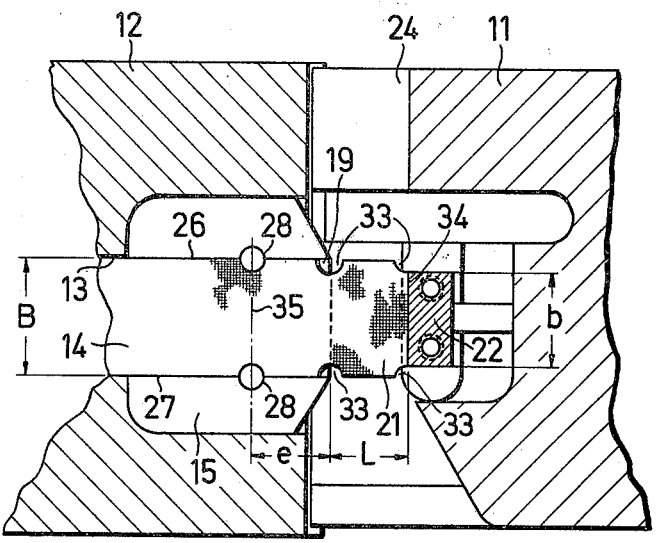
FIG. 2 is a horizontal section taken on the line II—II of FIG. 1.

In FIG. 1 and 2 is schematically represented the pressing station of an apparatus for joining the ends of a rim-covering strip of plastic which essentially consists of the vertically movable press ram 10 and the back-pressure plate 11 which together with a laterally added base plate 12 are mounted in a machine bed or bench not shown in any detail. The base plate 12 shows on its top side a flat channel for a wire-cloth strip 14 which is supplied to the pressing station from a delivery spool here not shown in detail.

Into the base plate 12 is inserted a die plate 15 whose edge 17 projecting beyond the front edge 16 of the base plate 12 forms a holding edge for the lower strip end 18 of the rim-covering strip to be sealed and at the same time has a cutting edge 19 on its top side which cooperates with a corresponding edge 20 on the sealing ram 10 and on which the piece of wire cloth 21 required in the particular case is cut off.

The specific piece of wire cloth 21 to be processed butts on the opposite side against an electrode 22 whose width b in the longitudinal direction of the strip ends 18, 25 is smaller than the greatest width B of the piece of wire cloth 21 interposed between the strip ends 18, 25.

The electrode 22, is covered by insulating material 23, inserted into the back-pressure plate 11 and forms together with the edge 17 of the die 15 a channel 24 for the strip ends 18 and 25 to be joined together.

At a distance corresponding to the length L of the wire-cloth piece 21 from the front edge 17 of the die plate 15 are provided in the latter in the area of the front edges 26 and 27 of the wire cloth strip in places opposite each other matrices 28 for piercing tools 29 which are vertically movable in guides 30 of a cover plate 31 and actuated by a projecting nose 32 of the sealing ram 10. The cover plate 31 forms together with the die plate 15 the second electrode which lies opposite the first electrode 22.

For producing a seal for the ends 18 and 25 of the rim-covering strip, in the present case of transparent polyester, lying superposed in the channel 24 the piece of wire cloth provided with the semicircularly or quadrantally shaped marginal recesses 33, still attached to the wire-cloth strip 14, is laterally fed between the strip ends 18 and 25 until its longitudinal front edge 34 abuts against the electrode 22. The sealing ram 10 is then lowered in the direction of the arrow. Its cutting edge 20 severes the piece of wire cloth 21 on the edge 19 of the front margin 17 of the die plate 15. At the same time are the two piercing tools 29 pushed downwards and punch in the front edges 26 and 27 of the wire-cloth strip semicircular holes out of the wire-cloth strip 14 at the next following line of separation.

The ends 18 and 25 of the strip are now tightly compressed with the piece of wire cloth 21 lying in between. After the current is switched on, the piece of wire cloth lying on the electrodes 22 and 31 is heated and softens the facing surfaces of the strip ends 18 and 25 which enter into a very firm union with the piece of wire cloth 21 and with each other under the pressure of the sealing ram 10.

Figure 3:
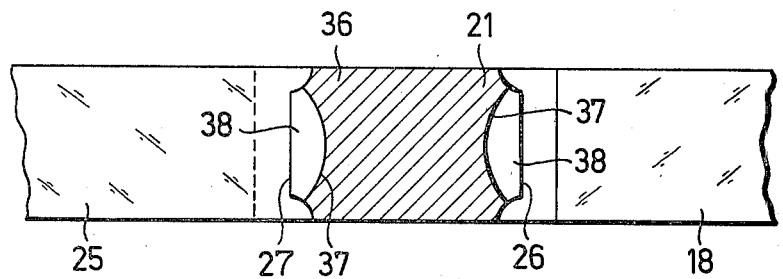
FIG. 3 is a top view of a junction with a fused-in wire-cloth piece produced with the apparatus according to FIG. 1 and FIG. 2.

The junction has then the shape depicted in FIG. 3. In this setup softening of the plastic and a tight connection and meshing have occurred only in the obliquely shaded area and one recognizes that on the front edges 26 and 27 of the wire-cloth piece 21 no tight joint exists between the strip ends. In this case the dividing lines are mostly not so clearly defined as they are shown in FIG. 3 by the arched lines 37 but the area of firm connection 36 changes usually gradually over into the transitional zone 38 where a less thorough fusion has taken place because the wire cloth has here been heated to a lower degree.

Figure 4:
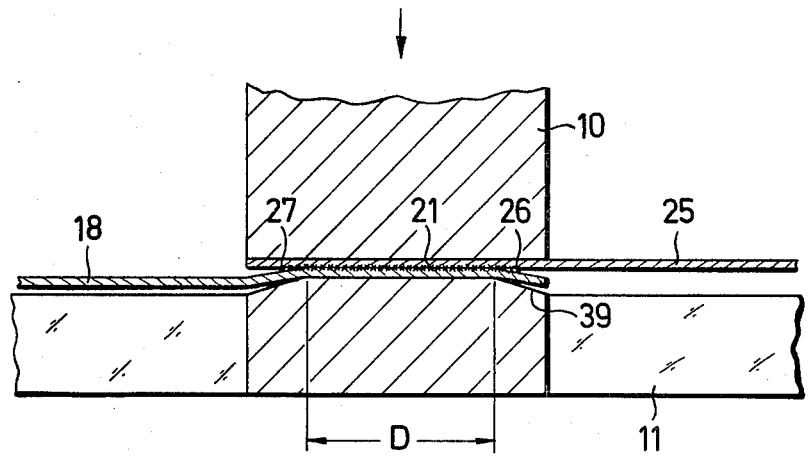
FIG. 4 is an alternative embodiment of the sealing ram and back-pressure plate of an apparatus similar to that shown in FIG. 1 and FIG. 2.

In the example of execution shown in FIG. 4 the area of pressure D of the back-pressure plate 11 does not immediately come up to the front edges 26 and 27 of the wire-cloth piece 21 extending at right angles to the longitudinal direction of the strip, which piece may have in this example of a realization a simple, rectangular shape without corner cutouts. One recognizes that the front edges 39 extending at right angles to the longitudinal direction of the strip of the pressure area D of the back-pressure plate 11 are beveled, so that the pressing effect is confined to the area D.

Figure 5:
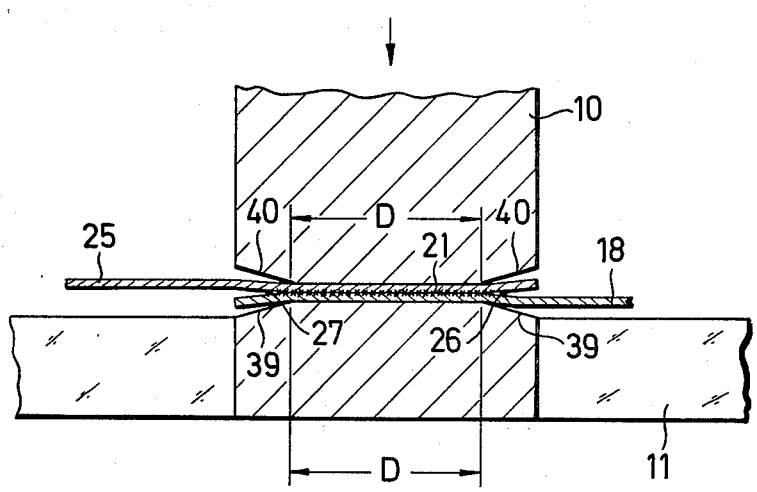
FIG. 5 is a still further alternative embodiment of the sealing ram and the back-pressure plate in lateral view.

In the example of execution according to FIG. 5 the conditions are similar. However, here are not only the front edges 39 of the back-pressure plate 11 chamfered but also the front edges 40 of the sealing ram, so that the pressure area D does here not come up to the front edges 26 and 27 of the piece of wire cloth 21.

Figure 6:
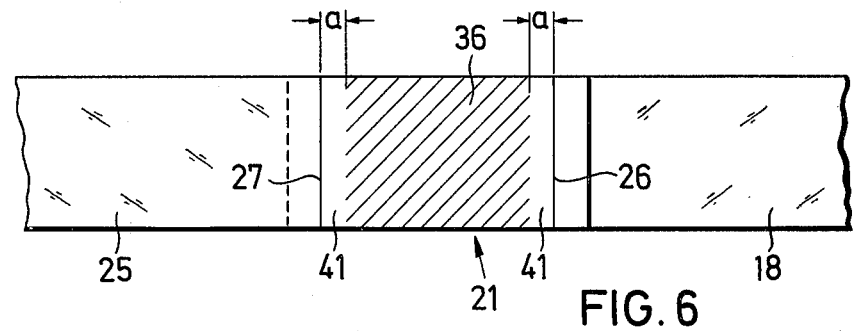
FIG. 6 shows the junction of the strip ends with a fused-in-wire-cloth piece which is produced with a pressing tool according to FIG. 4 or FIG. 5.

The sealing picture which results from these two devices according to FIG. 5 is depicted in FIG. 6. One recognizes that the solidly fused zone ends here at the distance a from the front edges 26 and 27 of the wire-cloth piece 21 and that in the relief zones 41 the very dense and thorough fusion 36 changes over into a less intimate union.

Figure 7:
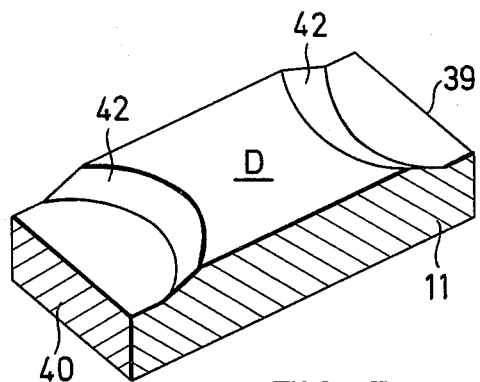
FIG. 7 is still a further alternative embodiment of the back-pressure plate for the pressing station of an apparatus according to the invention in perspective representation; and, FIG. 8 is a top view of a junction of the strip ends with a fused-in wire-cloth piece produced with a back-pressure plate according to FIG. 7.
Figure 8:
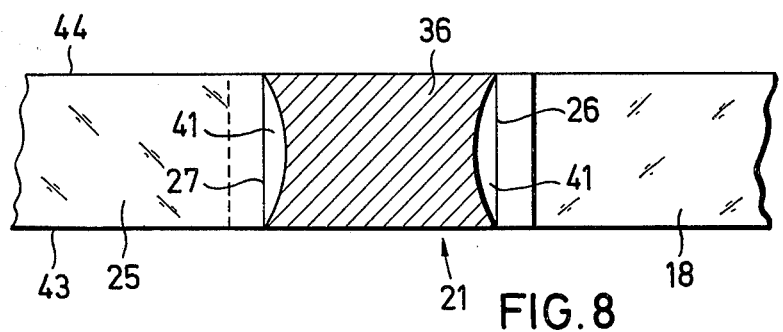

In FIG. 7 is shown the center piece of a back-pressure plate whose pressure area D has on each of the front edges 39 and 40 extending at right angles to the longitudinal direction of the strip a concave, open-edged recess 42. The seal produced by such a back-pressure plate 11 shows the sealing picture represented in FIG. 8. Here corresponds the welding area 36 essentially to the shape of the pressure area D of the back-pressure plate 11. This solidly fused area 36 changes also here over into zones 41 relieved of the pressure which narrow down toward the longitudinal edges 43 and 44 of the strip ends. In this example of execution there is no softening of the strip material only in the median area of the pressure-relieved zones 41. A notching effect on the front edges 26 and 27 of the wire-cloth piece 21 is however just as unlikely as in the case of the other strip-sealing methods.

The invention is not limited to the embodiments shown. It is for instance also possible to provide not only the back-pressure plate but also the bearing-surface area of the sealing ram on both front edges with concave recesses. It is also possible to use recesses of a different shape or to give the edges of the sealing ram and of the back-pressure plate a spherical appearance. Furthermore, the recesses at the corners of the wire-cloth piece can have a somewhat altered shape and it is also possible to use pieces of wire cloth which have, distributed over its width, wires of different conductivity. It is, however, important in any case that the heating or the pressure upon the piece of wire cloth on its front edges extending at right angles to the longitudinal direction of the strip ends is smaller than in the remaining area.

Having thus described the invention, it is claimed:

1. An apparatus for joining superposed strip ends of a plastic strip comprising: pressing means for pressing the strip ends together, said pressing means having a sealing ram and a back pressure plate, a first electrode located at one side edge of said pressing means, a second electrode located at an opposite side edge of said pressing means, a channel extending outwardly relative to said pressing means from said one side edge, said channel having a length of wire cloth therein for insertion between said superposed strip ends, said wire cloth having a predetermined width when moved between said pressing means and against said second electrode, said first and second electrodes having a width smaller than the predetermined width of said wire cloth, and a cutting punch having a cutting edge located immediately adjacent said first electrode, said cutting punch providing a cut edge in said wire cloth generally transverse to said width of said wire cloth, piercing tools located at opposite edges of said channel along a line generally transverse to said width of said wire cloth, said piercing tools being disposed a distance from said cutting punch equal to the distance between said first and second electrodes, said piercing tools providing open-edge recesses in said wire cloth at opposed corners thereof.

2. An apparatus according to claim 1, characterized in that the piercing tools are actuated by the sealing ram.

3. An apparatus for joining a length of superposed strip ends of a plastic strip, the apparatus comprising: pressing means for pressing together the superposed strips ends with a width of wire cloth inserted between said superposed strip ends, said pressing means including a sealing ram and a back-pressure plate, first and second electrodes being positioned one at each edge of said superposed strip ends, said wire cloth contacting both said first and second electrodes upon being inserted between said strip ends, at least one of said sealing ram and said back-pressure plate being shorter than the width of said wire cloth, at least one of said sealing ram and said back-pressure plate having at least one chamfered edge generally transverse to the width of said wire cloth.

4. An apparatus according to claim 3, characterized in that at least one of said sealing ram and said back-pressure plate has concave recesses facing outwardly relative to one another at opposite edges generally transverse to the width of said wire cloth and transverse to a pressing direction.

* * * * *